US008632314B2

(12) United States Patent
Imaizumi et al.

(10) Patent No.: US 8,632,314 B2
(45) Date of Patent: Jan. 21, 2014

(54) COOLING FAN DRIVING DEVICE AND FAN ROTATIONAL SPEED CONTROL METHOD

(75) Inventors: Masaaki Imaizumi, Hitachinaka (JP); Minoru Wada, Hitachinaka (JP)

(73) Assignee: Komatsu Ltd., Tokyo (JP)

( * ) Notice: Subject to any disclaimer, the term of this patent is extended or adjusted under 35 U.S.C. 154(b) by 116 days.

(21) Appl. No.: 13/148,079

(22) PCT Filed: Mar. 10, 2010

(86) PCT No.: PCT/JP2010/053943
§ 371 (c)(1), (2), (4) Date: Aug. 5, 2011

(87) PCT Pub. No.: WO2010/110059
PCT Pub. Date: Sep. 30, 2010

(65) Prior Publication Data

US 2011/0293439 A1 Dec. 1, 2011

(30) Foreign Application Priority Data

Mar. 24, 2009 (JP) ................................ 2009-072122

(51) Int. Cl.

| | |
|---|---|
| ***F01P 7/10*** | (2006.01) |
| ***F01P 7/02*** | (2006.01) |
| ***F16D 31/00*** | (2006.01) |
| ***F16D 31/02*** | (2006.01) |
| ***F16D 33/00*** | (2006.01) |
| ***F16D 37/00*** | (2006.01) |
| ***F16D 39/00*** | (2006.01) |

(52) U.S. Cl.
USPC .............. 417/22; 60/329; 60/422; 123/41.12; 123/41.49

(58) Field of Classification Search
USPC ............ 417/42, 46, 22, 32; 123/41.11, 41.12, 123/41.48, 41.49; 60/329, 422
See application file for complete search history.

(56) References Cited

U.S. PATENT DOCUMENTS

| | | | | |
|---|---|---|---|---|
| 6,076,488 | A * | 6/2000 | Yamagishi | 123/41.12 |
| 6,349,882 | B1 | 2/2002 | Kita et al. | |

(Continued)

FOREIGN PATENT DOCUMENTS

| | | | |
|---|---|---|---|
| CN | 1573126 | A | 2/2005 |
| EP | 1 479 920 | A2 | 11/2004 |
| JP | 2004-225867 | A | 8/2004 |
| JP | 2004-347040 | A | 12/2004 |
| JP | 2005-76525 | A | 3/2005 |
| WO | 2009/001633 | A1 | 12/2008 |

OTHER PUBLICATIONS

International Search Report mailed Apr. 6, 2010 from International Application No. PCT/JP2010/053943, 1 page.

*Primary Examiner* — Peter J Bertheaud
(74) *Attorney, Agent, or Firm* — Fish & Richardson P.C.

(57) ABSTRACT

The invention reduces waste of flow volume of pressurized oil discharged from a hydraulic pump when the rotational speed of a cooling fan is increased to the target rotational speed. The target rotational speed of the cooling fan is set at a target rotational speed setting portion. An acceleration pattern for increasing the cooling fan to the target rotational speed is set at an acceleration pattern setting portion based on the rotational speed of the cooling fan, the target rotational speed set at the target rotational speed setting portion, and magnitude of force due to inertia of the cooling fan and the hydraulic motor. The rotational speed command value calculation portion controls the pressurized oil to be supplied to the hydraulic motor at a flow rate required. Thus, it is possible to reduce wasted relief flow volume.

10 Claims, 6 Drawing Sheets

(56) References Cited

U.S. PATENT DOCUMENTS

| | | | | |
|---|---|---|---|---|
| 6,481,388 | B1 * | 11/2002 | Yamamoto | 123/41.12 |
| 6,959,671 | B2 * | 11/2005 | Nakagawa et al. | 123/41.49 |
| 7,275,368 | B2 * | 10/2007 | Furuta et al. | 60/329 |
| 7,281,370 | B2 * | 10/2007 | Furuta et al. | 60/329 |
| 7,841,307 | B2 * | 11/2010 | Itoga et al. | 123/41.12 |
| 7,856,951 | B2 * | 12/2010 | Kamado et al. | 123/41.49 |
| 8,459,959 | B2 * | 6/2013 | Imaizumi et al. | 417/46 |
| 2004/0231326 | A1 | 11/2004 | Imanishi et al. | |
| 2011/0011356 | A1 * | 1/2011 | Tanaka et al. | 123/41.12 |

* cited by examiner

COOLING FAN DRIVING DEVICE AND FAN ROTATIONAL SPEED CONTROL METHOD

CROSS REFERENCE TO RELATED APPLICATIONS

This application claims priority to Application No. PCT/JP2010/053943 filed on Mar. 10, 2010, which application claims priority to Japanese Application No. 2009-072122 filed on Mar. 24, 2009. The entire contents of the above applications are incorporated herein by reference in their entireties.

TECHNICAL FIELD

The invention relates to a cooling fan driving device and a fan rotational speed control method using the device used for a hydraulically-driven machine such as a construction machine.

BACKGROUND ART

In a hydraulically-driven machine such as a construction machine, the rotational speed of a hydraulic motor, that is, the rotational speed of a cooling fan, is controlled by controlling flow rate of pressurized oil supplied to the hydraulic motor while supplying the pressurized oil discharged from a hydraulic pump for the cooling fan which is driven by an engine to the hydraulic motor which rotates the cooling fan. Then, the control is performed on the rotational speed of the cooling fan so that temperature of cooling water of the engine, temperature of hydraulic oil and the like are to be desired temperature.

A fan rotational speed control method (for example, see Patent Document 1) and the like are proposed as the configuration to control the rotational speed of a cooling fan. FIG. 9 is a flowchart describing a fan rotational speed control method disclosed in Patent Document 1 as being the related art for the invention.

As described in FIG. 9, according to the fan rotational speed control method disclosed in Patent Document 1, control is performed on a pump-motor system so that fan driving is started from a state that the fan rotational speed is at the minimum fan rotational speed Nmin at the time of starting engine (step 1). The pump-motor system is constituted with a hydraulic motor to drive a fan and a hydraulic pump to supply pressurized oil to the hydraulic motor. When the fan rotation is started, control is performed so that the state at the minimum rotational speed Nmin is maintained at least for several seconds (step 2).

After the state of being maintained at the minimum fan rotational speed Nmin at least for several seconds, control to increase the fan rotational speed from the minimum fan rotational speed Nmin gradually is performed (step 3). Then, the pump-motor system is controlled so that the fan rotational speed is increased to the target fan rotational speed Ntf when at least several seconds passes after the fan rotational speed is gradually increased (step 4).

Occurrence of peak pressure and pressure hunting at the pump-motor system is prevented by performing the above control. Accordingly, the pump-motor system is prevented from being broken.

CITED DOCUMENT

Patent Document

Patent Document 1: Japanese Patent Application Laid-open No. 2005-76525

SUMMARY OF THE INVENTION

Problems to be Solved by the Invention

According to the invention described in Patent Document 1, the fan rotational speed is maintained at the minimum fan rotational speed Nmin during passage of set constant time T1 from the engine starting. Then, after the constant time T1 passes, control of the fan rotational speed to reach the target fan rotational speed Ntf is performed as gradually increasing at a constant gradient from the minimum fan rotational speed Nmin for constant time T2. At the same time, feedback control is performed so that each of detection temperature of to-be-cooled fluid to be cooled by the fan reaches each target temperature.

In this manner, according to the invention described in Patent Document 1, control is performed to increase the fan rotational speed gradually at a constant gradient so that the fan rotational speed reaches the target fan rotational speed Ntf from the minimum fan rotational speed Nmin.

In general, when a fan and a hydraulic motor to drive a fan is accelerated from a state of the small rotational speed to the large rotational speed, large impetus is required to overcome force due to inertia to maintain a stopped state of the hydraulic motor or the fan itself for starting fan rotation.

Then, in accordance with the increase of the fan rotational speed, less force is required to increase the rotational speed of the fan and the hydraulic motor. That is, with the increased rotational speed, the rotation of the hydraulic motor and the fan is to be maintained as being rotated at constant speed owing to force due to inertia of the hydraulic motor and the fan. Accordingly, under such conditions, a large force is not required to rotate the hydraulic motor and the fan.

Here, when control is performed to increase the fan rotational speed at a constant gradient gradually as described in Patent Document 1, flow volume of pressurized oil discharged from the hydraulic pump is not entirely used for rotation of the hydraulic motor and flow volume of unused pressurized oil is to be wasted to a tank from a relief valve which is a protection circuit of the hydraulic pump.

That is, according to the invention described in Patent Document 1, since consideration is not given to magnitude of force due to inertia of the hydraulic motor and the fan itself, control is performed to simply increase the fan rotational speed gradually at a constant gradient. Then, control is performed so that flow volume of pressurized oil required for increasing the fan rotational speed at a constant gradient is supplied to the hydraulic motor.

However, since force due to inertia to maintain a stopped state is largely exerted when the fan starts to be rotated, the rotational speed is increased only gradually. Accordingly, flow volume of pressurized oil being larger than flow volume of pressurized oil to be actually used for increasing the fan rotational speed is to be discharged from the hydraulic pump.

As a result, the flow volume of pressurized oil which is not used at the hydraulic pump is to be wasted to the tank from the relief valve which is the protection circuit of the hydraulic pump. Thus, when pressurized oil discharged from the hydraulic pump is ejected uneconomically, harmful effects such as deterioration of engine fuel consumption, increase of hydraulic oil temperature, and increase of relief noise are caused.

The invention provides a cooling fan driving device and a fan rotational speed control method using the device capable of reducing uneconomical waste of flow volume of pressurized oil discharged from the hydraulic pump when the rotational speed of the cooling fan is increased to the target rotational speed and capable of reducing energy loss.

Means for Solving the Problems

Issues of the invention can be achieved with a cooling fan driving device described in any one of claims 1 to 4 and a fan rotational speed control method described in claim 5 or claim 6.

That is, a cooling fan driving device according to the invention is most mainly characterized by including: a hydraulic pump for a cooling fan, the hydraulic pump being driven by an engine; a hydraulic motor to which pressurized oil discharged from the hydraulic pump is supplied and which rotates the cooling fan; an oil temperature sensor which detects temperature of hydraulic oil; a water temperature sensor which detects temperature of refrigerant; a rotational speed sensor which detects the rotational speed of the engine; flow rate control means which controls a flow rate of pressurized oil to be supplied to the hydraulic motor; and a controller which controls the flow rate control means, being characterized in that the controller includes a target rotational speed setting portion which sets the target rotational speed of the cooling fan, an acceleration pattern setting portion which sets an acceleration pattern for increasing the rotational speed of the cooling fan to the target rotational speed, and a rotational speed command calculation portion which issues a command of the flow rate of pressurized oil supplied to the hydraulic motor, the target rotational speed setting portion sets the target rotational speed of the cooling fan based on respective detection signals from the oil temperature sensor, the water temperature sensor and the rotational speed sensor, the acceleration pattern setting portion sets the acceleration pattern for increasing the rotational speed of the cooling fan to the target rotational speed based on the rotational speed of the engine detected by the rotational speed sensor, the target rotational speed of the cooling fan set at the target rotational speed setting portion, and magnitude of force due to inertia of the cooling fan and the hydraulic motor, and the rotational speed command calculation portion calculates a command value to control the flow rate control means based on the rotational speed of the engine, the target rotational speed of the cooling fan set at the target rotational speed setting portion, and the acceleration pattern set at the acceleration pattern setting portion so that the rotational speed of the cooling fan is increased from the current rotational speed to the target rotational speed based on the acceleration pattern.

The cooling fan driving device according to the invention is mainly characterized in that the acceleration pattern is set in advance based on performance of the hydraulic motor and size, weight and the like of the cooling fan.

Furthermore, the cooling fan driving device according to the invention is mainly characterized in that the flow rate control means is a swash plate angle control valve which controls a swash plate angle of the hydraulic pump of a variable displacement type.

Furthermore, the cooling fan driving device according to the invention is mainly characterized in that the flow rate control means is a flow rate control valve which controls the flow rate of pressurized oil supplied to the hydraulic motor.

The invention also provides a fan rotational speed control method to control the fan rotational speed of a cooling fan by supplying pressurized oil discharged from a hydraulic pump for the cooling fan to a hydraulic motor for the cooling fan, the hydraulic pump being driven by an engine, and by controlling a flow rate of the pressurized oil supplied to the hydraulic motor, mainly characterized by including: determining the target rotational speed of the cooling fan through temperature of hydraulic oil, temperature of refrigerant and the rotational speed of the engine which are detected; determining an acceleration pattern for increasing the rotational speed of the cooling fan to the target rotational speed through the rotational speed of the engine, the determined target rotational speed of the cooling fan, and magnitude of force due to inertia of the cooling fan and the hydraulic motor; and controlling the rotational speed of the cooling fan so as to be increased from the current rotational speed to the target rotational speed based on the acceleration pattern by controlling the flow rate of pressurized oil supplied to the hydraulic motor based on the rotational speed of the engine, the determined target rotational speed of the cooling fan and the acceleration pattern.

Furthermore, the fan rotational speed control method according to the invention is mainly characterized in that an acceleration pattern which is set in advance based on performance of the hydraulic motor and size, weight and the like of the cooling fan is utilized for the acceleration pattern.

Effects of the Invention

With the invention, the rotational speed of the cooling fan can be increased to the target rotational speed based on the acceleration pattern considering magnitude of force due to inertia of the cooling fan and the hydraulic motor. Accordingly, it is possible to control the flow rate of pressurized oil supplied to the hydraulic motor so that the rotational speed of the cooling fan is to be the target rotational speed while considering magnitude of force due to inertia of the cooling fan and the hydraulic motor.

Accordingly, it is possible to supply pressurized oil at the flow rate corresponding to an actual rotational state of the hydraulic motor to the hydraulic motor and to reduce flow volume of pressurized oil to be wasted without being used at the hydraulic motor. Then, it is possible to reduce energy loss and prevent occurrence of harmful effects such as deterioration of engine fuel consumption, increase of hydraulic oil temperature, and increase of relief noise.

Here, it is also possible to set in advance, as obtaining from experiment and the like, the acceleration pattern based on performance of the hydraulic motor and size, weight and the like of the cooling fan. It is possible to perform feedforward control on the rotational speed control of the cooling fan according to the invention by utilizing the acceleration pattern which is set in advance. Here, even when each detection temperature of the to-be-cooled fluid to be cooled by the cooling fan is fluctuated, it is not influenced by the fluctuation not like a case of performing feedback control. Thus, the rotational speed of the cooling fan can be controlled to be the target rotational speed without being influenced by the fluctuation of each detection temperature.

With this configuration, the rotational speed control of the cooling fan becomes easy, so that the configuration to perform the rotational speed control of the cooling fan can be structured to be simple as well.

Here, the flow rate of pressurized oil supplied to the hydraulic motor can be actualized by controlling the swash plate angle of the hydraulic pump or by controlling the flow rate control valve disposed at the oil passage which connects the hydraulic pump and the hydraulic motor, as well.

BEST MODE FOR CARRYING OUT THE INVENTION

In the following, preferable embodiments of the invention will be specifically described with reference to the attached drawings. A cooling fan driving device and a fan rotational speed control method of the invention can be preferably applied to a work vehicle having a cooling fan.

In particular, it is preferably applied to a work vehicle of which engine is frequently accelerated and decelerated. For example, in a work vehicle such as a wheel loader, acceleration and deceleration of an engine are frequently performed while repeatedly performing back-and-forth motion operation and V-shape motion operation during cargo handling operation and the like.

When acceleration and deceleration of the engine are frequently performed, the rotational speed of a hydraulic pump for a cooling fan driven with engine rotation is also increased and decreased along with the rotational speed of the engine. Since a hydraulic motor for the cooling fan is driven by flow of pressurized oil discharged from the hydraulic pump for the cooling fan, the rotational speed of the hydraulic motor for the cooling fan is influenced by the engine rotation as well. In accordance with acceleration and deceleration of the engine, control of the rotational speed of the hydraulic motor for the cooling fan to increase to the target rotational speed is to be repeatedly performed.

With a structure not like the invention, situations of uneconomical waste of flow volume of pressurized oil discharged from the hydraulic pump frequently occur when performing increasing control of the rotational speed of the cooling fan to the target rotational speed corresponding to temperature etc. of refrigerant which is to be cooled by the cooling fan. The invention can be preferably applied in particular to such a work vehicle of which engine is frequently accelerated and decelerated.

Figure 1:
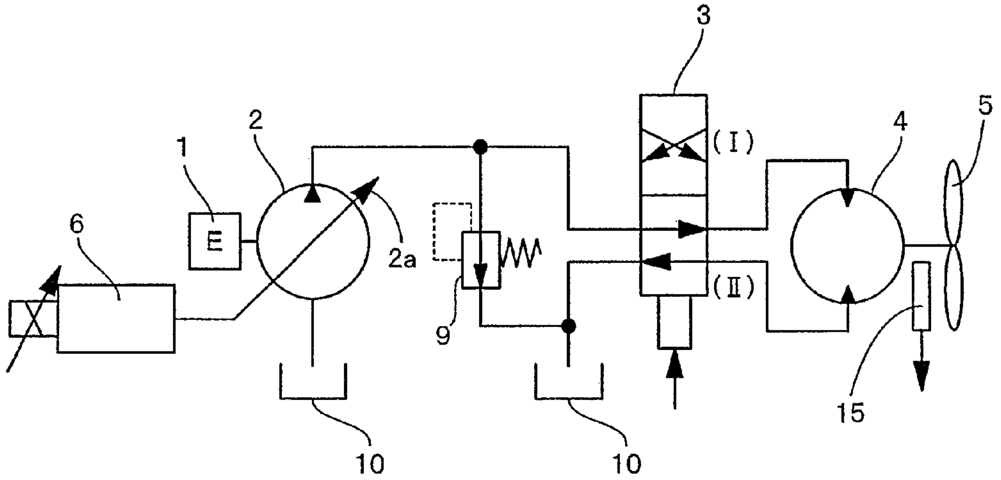
FIG. 1 is a hydraulic circuit diagram according to an embodiment of the invention.

FIG. 1 is a hydraulic circuit diagram utilized for a cooling fan driving device according to an embodiment of the invention. A variable displacement type hydraulic pump (hereinafter, called the hydraulic pump 2) arranged for a cooling fan is driven by an engine 1. Pump capacity per each rotation (cc/rev) of the hydraulic pump 2 is to be controlled by controlling a swash plate control valve 6 with a control command from a controller 7 (not illustrated, see FIG. 2).

Figure 2:
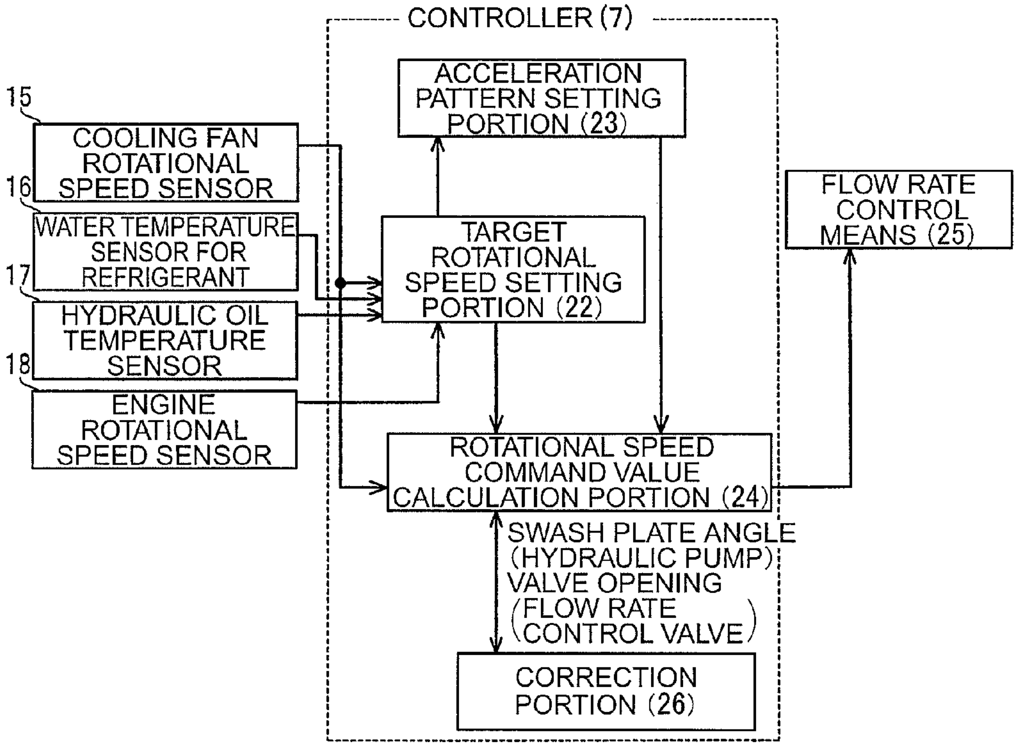
FIG. 2 is a structural diagram of a controller of the present embodiment.

That is, an angle of a swash plate **2*a* of the hydraulic pump 2 is to be controlled by controlling the swash plate control valve 6, so that the hydraulic pump 2 can obtain a swash plate angle corresponding to the control command from the controller 7 (see FIG. 2). Then, it is possible to control a flow rate of pressurized oil discharged from the hydraulic pump 2 by the rotational speed of the engine 1 at that time and the swash plate angle controlled by the swash plate control valve 6, that is, the pump capacity of the hydraulic pump 2**.

The pressurized oil flow discharged from the hydraulic pump 2 is supplied to a hydraulic motor 4 for the cooling fan via a switching valve 3 for forward reverse rotation. The switching valve 3 can be selectively switched between two positions of position I and position II with a control command from the controller 7 (not illustrated, see FIG. 2). For example, when it is switched to position II in FIG. 1, the hydraulic motor 4 can be forwardly rotated. When it is switched to position I, the hydraulic motor 4 can be reversely rotated.

Pressurized oil ejected from the hydraulic motor 4 is ejected to a tank 10 via the switching valve 3. Further, a relief valve 9 is disposed between the tank 10 and an oil passage which connect the hydraulic pump 2 and the switching valve 3 so as to control pump pressure supplying to the hydraulic motor 4 not to be predetermined pressure or higher.

The rotational speed of a cooling fan 5 which is rotationally driven by the hydraulic motor 4 can be detected by a cooling fan rotational speed sensor 15. A detection value detected by the cooling fan rotational speed sensor 15 is inputted to the controller 7. Instead of directly detecting the rotational speed of the cooling fan 5 by the cooling fan rotational speed sensor 15, it is also possible to indirectly obtain the rotational speed of the hydraulic motor 4 by detecting the swash plate angle of the hydraulic pump 2 or the flow rate of pressurized oil supplied to the hydraulic motor 4 while detecting the rotational speed of the engine 1 by an engine rotational speed sensor 18.

Figure 7:
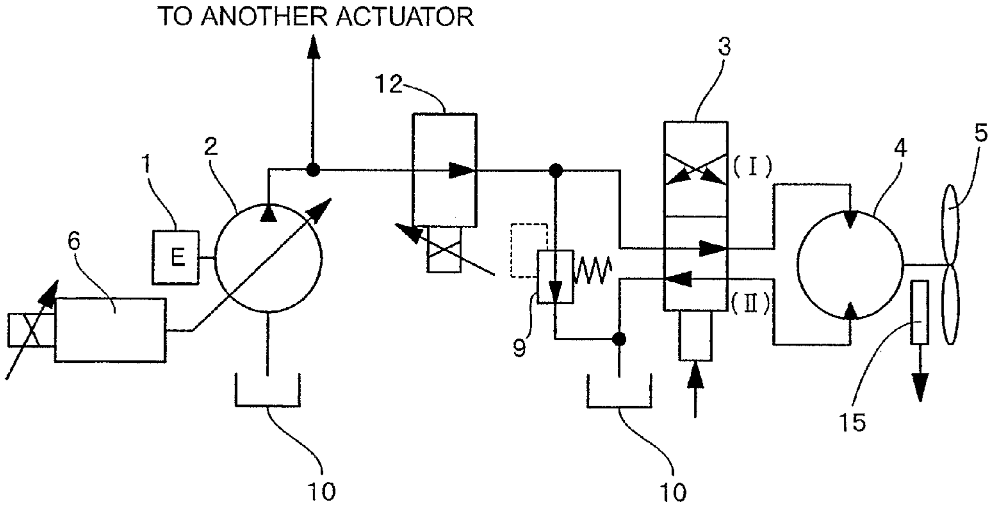
FIG. 7 is a hydraulic circuit diagram according to another embodiment of the invention.

For example, as illustrated in FIG. 7 which is described later, the flow rate of pressurized oil supplied to the hydraulic motor 4 can be obtained owing to a value of a control signal controlling a flow rate control valve 12 disposed at an oil passage which connects the hydraulic pump 2 and the hydraulic motor 4. That is, opening area of the flow rate control valve 12 is controlled corresponding to the value of the control signal controlling the flow rate control valve 12. The flow rate of pressurized oil passing through the flow rate control valve 12 can be obtained by acquiring the opening area of the flow rate control valve 12 from the value of the control signal controlling the flow rate control valve 12.

That is, since the flow rate of pressurized oil discharged from the hydraulic pump 2 can be obtained from the rotational speed of the engine 1 and the swash plate angle of the hydraulic pump 2, the flow rate of pressurized oil passing through the flow rate control valve 12 can be obtained by acquiring the opening area of the flow rate control valve 12.

The hydraulic pump 2 in FIG. 7 and FIG. 8 which is described later is used in common also for an actuator other than the hydraulic motor 4 which drives the cooling fan 5. Accordingly, the pump swash plate angle of the hydraulic pump 2 is to be controlled against the required flow rate including for another actuator other than the hydraulic motor 4. The flow rate of pressurized oil supplied to the hydraulic motor 4 is to be controlled by utilizing the flow rate control valve 12 or a flow rate control valve 14. Here, instead of the variable displacement type hydraulic pump, it is also possible to utilize a fixed displacement type hydraulic pump for the hydraulic pump in FIGS. 7 and 8.

Accordingly, it is possible to indirectly obtain the rotational speed of the hydraulic motor 4 corresponding to the flow rate of pressurized oil supplied to the hydraulic motor 4, that is, the rotational speed of the cooling fan 5. In this manner, in the case that the swash plate angle of the hydraulic pump 2 or the flow rate of pressurized oil supplied to the hydraulic motor 4 is acquired, it is also possible to detect the rotational speed of the cooling fan 5 by detecting the rotational speed of the engine 1.

In the following, cooling fan rotational speed control according to the invention performed by the controller 7 will be described using FIG. 2. The controller 7 receives respective inputs of temperature of refrigerant cooling the engine 1 and the like detected by a water temperature sensor 16, temperature of hydraulic oil detected by an hydraulic oil temperature sensor 17, the rotational speed of the engine 1 detected by the engine rotational speed sensor 18, and the rotational speed of the cooling fan 5 detected by the cooling fan rotational speed sensor 15. It is also possible for the engine rotational speed sensor 18 and the cooling fan rotational speed sensor 15 to perform inputting only by either of them.

The respective detection values are inputted to a target rotational speed setting portion 22 which is arranged in the controller 7. The target rotational speed of the cooling fan 5 is set at the target rotational speed setting portion 22 based on the respective detection values which are inputted. As the target rotational speed of the cooling fan 5, it is possible to set the target rotational speed of the cooling fan 5 by utilizing a graph indicated at the left side of FIG. 3, for example.

Figure 3:
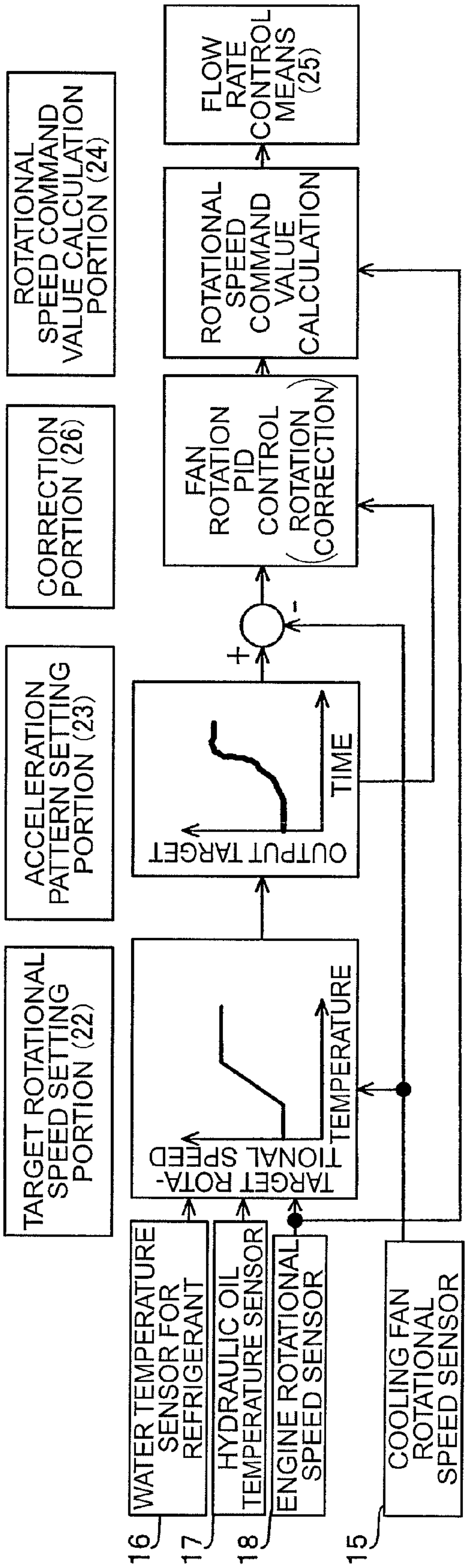
FIG. 3 is a control block diagram of the present embodiment.

As the graph indicated at the left side of FIG. 3, it is possible to obtain the target rotational speed of the cooling fan 5 from simulation, experiment and the like as being associated with the respective detection temperature inputted to the target rotational speed setting portion 22.

Alternatively, for example, it is also possible to obtain the target rotational speed of the cooling fan 5 from calculation with the respective detection values inputted to the target rotational speed setting portion 22 by utilizing a statistical-processing-like method and the like. Since the invention is not characterized in the method to obtain the target rotational speed of the cooling fan 5, it is possible to utilize any of various setting methods which are known in the related art as long as being capable of setting the target rotational speed of the cooling fan 5 to be the appropriate rotational speed so as not to cause overheating in temperature of the refrigerant and the hydraulic oil.

An acceleration pattern to increase the rotational speed of the cooling fan 5 to the target rotational speed can be set at an acceleration pattern setting portion 23 based on the current rotational speed of the cooling fan 5 detected by the cooling fan rotational speed sensor 15, the target rotational speed set at the target rotational speed setting portion 22, and magnitude of force due to inertia of the cooling fan 5 and the hydraulic motor 4.

The magnitude of force due to inertia of the cooling fan 5 and the hydraulic motor 4 can be obtained from experiment, simulation using second inertia moment values and angular acceleration of the respective cooling fan 5 and the hydraulic motor 4. The value of second inertia moment can be calculated through structural calculation. Alternatively, it can be also obtained as described in the following.

For example, when "Ip" denotes magnitude of force due to inertia of the cooling fan 5 and the hydraulic motor 4, the value of magnitude of force due to inertia can be expressed as a function of motor torque [N·m] of the hydraulic motor 4 with the cooling fan 5 disposed and angular acceleration $d\omega/dt$ [rad/sec·sec] of the hydraulic motor 4 with the cooling fan 5 disposed. That is, it can be expressed as $Ip=T/(d\omega/dt)$.

Then, the motor torque T of the hydraulic motor 4 with the cooling fan 5 disposed can be obtained by obtaining motor pressure Pm [Mpa] of the hydraulic motor 4 with the cooling fan 5 disposed, the motor rotational speed Rm [rpm] of the hydraulic motor 4 with the cooling fan 5 disposed, motor capacity Qm [cc/rev] of the hydraulic motor 4, torque efficiency $\eta t$ of the hydraulic motor 4 with the cooling fan 5 disposed, and acceleration time $\Delta tacc$ [sec] by actual measurement or experiment and the like.

That is, it can be obtained as $T=Qm\times Pm\times\eta t/(2\times\pi)$. Here, $\pi$ indicates angle in notation of radian measure. Angle of 180 degrees is expressed as $1\times\pi$ radian in radian measure. Further, angular acceleration $d\omega/dt$ can be expressed as $d\omega/dt=Rm\times 2\times\pi/(60\times\Delta tacc)$.

From the equations to obtain the motor torque T and the angular acceleration $d\omega/dt$ of the hydraulic motor 4, the value of magnitude "Ip" of force due to inertia can be expressed as $Ip=Qm\times Pm\times\eta t/(2\times\pi)/(Rm\times 2\times\eta/(60\times\Delta tacc))$. That is, the value of magnitude "Ip" of force due to inertia can be obtained by calculating the equation of $Ip=60\times Qm\times Pm\times\eta t\times\Delta tacc/(4\times Rm\times\pi\times\pi)$.

In this manner, it is possible to set the acceleration pattern as indicated with the second graph from the left of FIG. 3. The vertical axis of the graph denotes output target. Here, the output target can be also read as the flow rate of pressurized oil supplied to the hydraulic motor 4. As indicated in FIG. 3, the acceleration pattern to increase impetus gradually is set so as to act against force due to inertia of the cooling fan 5 and the hydraulic motor 4 at the time of starting for increasing the current rotational speed of the cooling fan 5 to the target rotational speed set at the target rotational speed setting portion 22.

On the acceleration pattern, the flow rate of pressurized oil supplied to the hydraulic motor 4 is gradually increased so that the angular acceleration of the hydraulic motor 4 is gradually increased with time from the time of starting. When acceleration control of the hydraulic motor 4 is performed on the acceleration pattern, it is possible to reduce relief flow volume to be wasted without being consumed while performing the acceleration control of the hydraulic motor 4.

In this manner, it is also possible to increase magnitude of force due to inertia which is intended to maintain the cooling fan 5 and the hydraulic motor 4 gradually, keeping the speed of rotation constant in accordance with gradual increase of the angular acceleration of the hydraulic motor 4. As indicated in FIG. 3, when the flow rate of pressurized oil supplied to the hydraulic motor 4 is increased in a quadratic manner, it is possible to reduce relief flow volume to be wasted without being consumed at the hydraulic motor 4.

Then, after the rotational speed of the hydraulic motor 4 reaches the target rotational speed of the cooling fan 5, it is possible to continue to supply pressurized oil to the hydraulic motor 4 at a flow rate necessary for maintaining the reached rotational state.

As described above, the acceleration pattern set at the acceleration pattern setting portion 23 can be set as being based on the rotational speed of the cooling fan 5 detected by the cooling fan rotational speed sensor 15, the target rotational speed set at the target rotational speed setting portion 22, and magnitude of force due to inertia of the cooling fan 5 and the hydraulic motor 4. Alternatively, it is also possible to set the acceleration pattern in advance from experiment, simulation and the like.

Even in the case that the acceleration pattern is set in advance, it is also possible to set different acceleration patterns in accordance with respective states of the rotational speed from which the rotational speed of the cooling fan 5 is started to be increased to the target rotational speed. In this case, for increasing to the target rotational speed, situations of force due to inertia of the cooling fan 5 and the hydraulic motor 4 vary in accordance with the state of the rotational speed of the cooling fan 5 at the time of starting.

Accordingly, it is possible to form the acceleration patterns by effectively utilizing situations of force due to inertia in accordance with conditions of the rotational speed of the cooling fan 5 at the time of starting respectively in accordance with the states of the cooling fan 5 at the time of starting. For example, it is possible to form rising of the acceleration pattern to be large. Accordingly, it is possible to reach the state of the target rotational speed earlier even when the situation of force due to inertia at the time of starting differs.

Instead of setting different acceleration patterns in accordance with a state of the rotational speed from which the cooling fan 5 is started, it is also possible to set only one acceleration pattern in advance and to utilize the one set acceleration pattern. In this case, as effectively utilizing a curved portion of the acceleration pattern, it is possible to respectively obtain a point on the curved portion of the acceleration pattern corresponding to the rotational speed when the cooling fan 5 is started to be accelerated toward the target rotational speed and a point on the curved portion of the acceleration pattern corresponding to the target rotational speed, and then, to form the curved portion between the two points to be the acceleration pattern.

By the way, since the hydraulic pump 2 is driven by the engine 1, the rotational speed of the hydraulic pump 2 is influenced by acceleration and deceleration of the rotational speed of the engine 1 when the engine 1 is frequently accelerated and decelerated. Here, the flow rate of pressurized oil discharged from the hydraulic pump 2 is to be also influenced by the acceleration and deceleration. Accordingly, when the engine 1 is frequently accelerated and decelerated, control of the rotational speed of the hydraulic motor 4 is repeatedly performed to be increased to the target rotational speed of the cooling fan 5 from a state of decelerated rotational speed.

As described above, in the invention, it is possible to accelerate the rotation of the hydraulic motor 4 on the acceleration pattern corresponding to the situation even when the hydraulic motor 4 is controlled to be accelerated to the target rotational speed of the cooling fan 5 from a state of low speed rotation. Accordingly, it is possible to reduce flow volume of pressurized oil to be wasted without being used for the rotation of the hydraulic motor 4. Thus, it is possible to prevent occurrence of harmful effects such as deterioration of engine fuel consumption, increase of hydraulic oil temperature, and increase of relief noise.

As illustrated in FIG. 2, the acceleration pattern set at the acceleration pattern setting portion 23 and the target rotational speed set at the target rotational speed setting portion 22 are inputted to the rotational speed command value calculation portion 24. By the way, FIG. 3 also indicates control to be performed at a correction portion 26 against the rotational speed of the cooling fan 5 after the rotational speed of the hydraulic motor 4 is increased to the target rotational speed of the cooling fan 5. Here, description is continued on the control without the control to be performed at the correction portion 26 as the control to be performed at the correction portion 26 will be described later.

At the rotational speed command value calculation portion 24, a control signal against flow rate control means 25 is prepared as calculating a rotational speed command value so that pressurized oil is supplied to the hydraulic motor 4 at a flow rate necessary for increasing the current rotational speed of the cooling fan 5 to the target rotational speed along the acceleration pattern. As the flow rate control means 25, it is possible to adopt the swash plate control valve 6 (see FIG. 1) which controls the swash plate angle of the hydraulic pump 2 as long as being means to control a flow rate of pressurized oil supplied to the hydraulic motor 4. Alternatively, it is possible to adopt the flow rate control valve 12 (see FIG. 7), the flow rate control valve 14 (see FIG. 8) or the like which supplies a part of flow volume of pressurized oil discharged from the hydraulic pump 2 to an actuator other than the hydraulic motor 4 and which supplies, to the hydraulic motor 4, as controlling the remaining pressurized oil after supplying to the other actuator.

At the rotational speed command value calculation portion 24, a control signal to control the swash plate angle of the hydraulic pump 2 is to be calculated when the swash control valve 6 (see FIG. 1) is to be controlled and the a control signal to control opening area of the flow rate control valve 12 or the flow rate control valve 14 respectively when the flow rate control valve 12 (see FIG. 7) or the flow rate control valve 14 (see FIG. 8) is to be controlled.

The flow rate control valve 12 illustrated in FIG. 7 is a modified example of the flow rate control means 25. The flow rate control valve 12 as the flow rate control means 25 is configured to be disposed at an oil passage which causes communication between the hydraulic pump 2 and the hydraulic motor 4. The flow rate control valve 12 is configured to control opening area of the oil passage which connects the hydraulic pump 2 and the hydraulic motor 4 with a control command from the controller 7 (not illustrated).

Then, the flow rate of pressurized oil supplied to the hydraulic motor 4 is decreased by decreasing the opening area, so that the rotational speed of the hydraulic motor 4 can be deceased. On the contrary, the flow rate of pressurized oil supplied to the hydraulic motor 4 is increased by increasing the opening area, so that the rotational speed of the hydraulic motor 4 can be increased.

Figure 8:
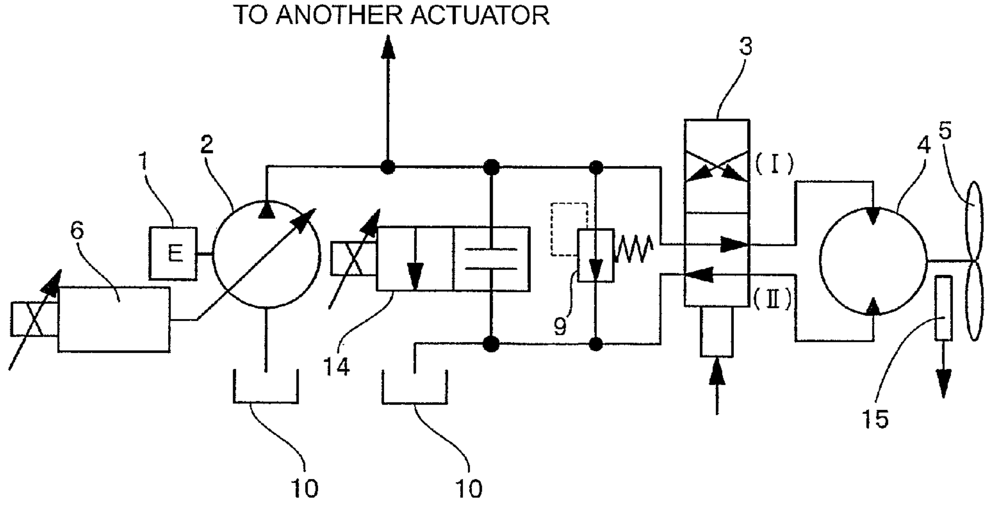
FIG. 8 is a hydraulic circuit diagram according to another embodiment of the invention.
Figure 9:
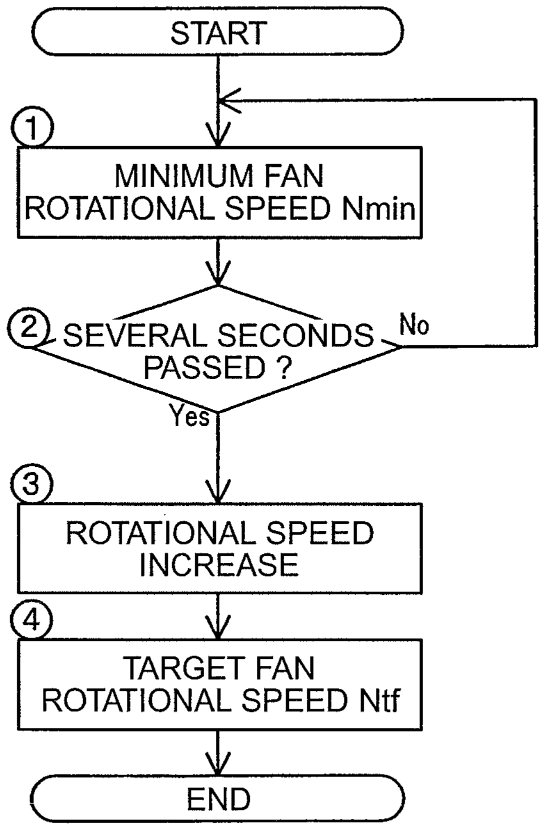
FIG. 9 is a flowchart describing a fan rotational speed control method in the related art.

The flow rate control valve 14 illustrated in FIG. 8 is another modified example of the flow rate control means 25. The flow rate control valve 14 is configured as a flow rate control valve capable of performing to connect and disconnect between the oil passage which causes communication between the hydraulic pump 2 and the hydraulic motor 4 and an oil passage which is connected to the tank 10. The flow rate control valve 14 is configured to control opening area through which the oil passage causing communication between the hydraulic pump 2 and the hydraulic motor 4 to the tank 10 is controlled with a control signal from the controller 7 (not illustrated).

Then, the flow rate of pressurized oil supplied to the hydraulic motor 4 is increased by putting the opening area of the flow control valve 14 connected to the tank 10 into a disconnected state or decreasing the opening area, so that the rotational speed of the hydraulic motor 4 can be increased. On the contrary, the flow rate of pressurized oil supplied to the hydraulic motor 4 can be decreased by increasing the opening area of the flow rate control valve 14 connected to the tank 10, so that the rotational speed of the hydraulic motor 4 can be decreased.

In this manner, by controlling the flow rate control means 25 illustrated in FIG. 2, acceleration control based on the acceleration pattern can be performed against the hydraulic motor 4 and the cooling fan 5 can be accelerated based on the acceleration pattern from the current rotational speed to the target rotational speed.

Thus, according to the invention, it is possible to reduce uneconomical waste of flow volume of pressurized oil discharged from the hydraulic pump 2 when the rotational speed of the cooling fan 5 is increased to the target rotational speed corresponding to temperature and the like of refrigerant which is cooled by the cooling fan 5. In particular, the invention can provide extremely effective operation against a work vehicle in which the engine 1 is frequently accelerated and decelerated.

Here, FIG. 3 also illustrates a control block to perform control against the rotational speed of the cooling fan 5 after the speed of hydraulic motor 4 is being closer to a constant speed state from an accelerated state as the rotational speed of the hydraulic motor 4 is increased closer to the target rotational speed of the cooling fan 5. In the following, description is performed on the control after the rotational speed of the hydraulic motor 4 is increased closer to the target rotational speed of the cooling fan 5.

The process at the correction portion 26 illustrated in FIGS. 2 and 3 is to be performed after the rotational speed of the hydraulic motor 4 gets closer approximately to the target rotational speed. Accordingly, the process at the correction portion 26 is to be skipped until the rotational speed of the hydraulic motor 4, that is, the rotational speed of the cooling fan 5, gets closer to the target rotational speed.

The flow rate of pressurized oil supplied to the hydraulic motor 4 is to be controlled based on the acceleration pattern which is set at the acceleration pattern setting portion 23 while the acceleration control of the hydraulic motor 4 is performed based on the acceleration pattern which is set at the acceleration pattern setting portion 23. Then, after the rotational speed of the cooling fan 5 is increased closer to the target rotational speed owing to the control based on the acceleration pattern, the rotational speed of the hydraulic motor 4 is controlled so that the rotational speed of the cooling fan 5 is maintained to be approximately equal to the target rotational speed.

Here, there may be a case that difference due to influence of secular variation occurs between the target rotational speed of the cooling fan 5 and the actual rotational speed of the cooling fan 5. Accordingly, in order to address efficiency variation with deterioration due to secular variation, the value of the target rotational speed of the cooling fan 5 is corrected at the correction portion 26 by utilizing difference between the target rotational speed of the cooling fan 5 and the current rotational speed of the cooling fan 5 detected by the cooling fan rotational speed sensor 15. Then, the actual rotational speed of the cooling fan 5 is prevented from being fluctuated by controlling the actual rotational speed of the cooling fan 5 to be the corrected rotational speed.

In order to perform correction of the target rotational speed, the value of the rotational speed of the cooling fan 5 is corrected at the correction portion 26 based on the above difference.

That is, describing based on the control block illustrated in FIG. 3, the difference between the target rotational speed of the hydraulic motor 4 which is controlled based on the acceleration pattern and the current rotational speed of the cooling fan 5 detected by the cooling fan rotational speed sensor 15 is inputted to the correction portion 26. The correction process against the target rotational speed is performed at the correction portion 26 corresponding to the above difference by utilizing the traditionally-known PID control (P, I and D are abbreviations respectively of Proportional, Integral and Derivative).

With the above, the difference can be controlled to be small and the actual rotational speed of the cooling fan 5 can be prevented from being fluctuated.

In the PID control, a cumulative value of deviation in the past is obtained with the integral action, a magnitude of current deviation is obtained with the proportional action, and a predictive value of future deviation is obtained with the derivative action. The so-called PID control which is known in the related art is the control as applying weight respectively on the obtained three values.

Since the rotational speed is basically invariant, similar control is performed for both the control in a steady state and the control in a correction state. Here, the PID control is not necessarily performed in all cases.

Figure 4:
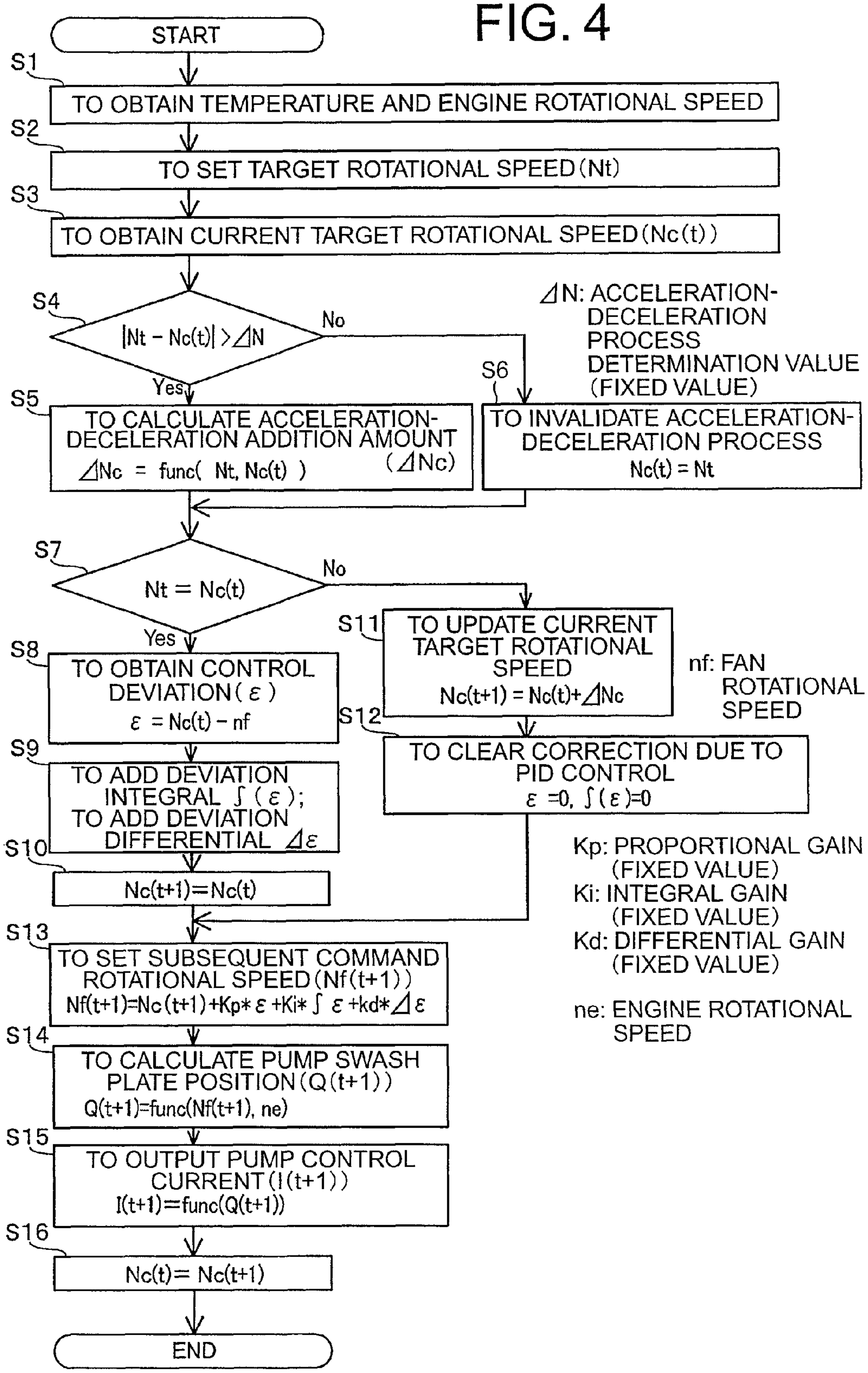
FIG. 4 is a flowchart for rotational speed control of a cooling fan of the present embodiment.

Next, the control flow to be performed in the invention will be described including the process at the correction portion 26 by utilizing a flowchart in FIG. 4. In step S1, a process is performed to obtain water temperature of cooling refrigerant for cooling the engine 1 and the like detected by the water temperature sensor 16, oil temperature of hydraulic oil detected by the hydraulic oil temperature sensor 17, and the rotational speed of the engine 1 detected by the engine rotational speed sensor 18. After the process in step S1 is completed, it proceeds to step S2.

In step S2, a process is performed to set the definitive target rotational speed Nt against the cooling fan 5 to be set at current time t by utilizing the target rotational speed setting portion 22. After the process in step S2 is completed, it proceeds to step S3.

In step S3, a process is performed to obtain the current target rotational speed Nc(t) corresponding to current time t based on the acceleration pattern which is set at the acceleration pattern setting portion 23. The target rotational speed Nt is the target rotational speed to be finally reached by the cooling fan 5 being set at the moment of time t. Then, the current target rotational speed Nc(t) is the target rotational speed based on the acceleration pattern at the moment of time t as a stage before the rotational speed of the cooling fan 5 reaches the definitive target rotational speed Nt.

The process to obtain the current target rotational speed Nc(t) can be performed with calculation at the rotational speed command value calculation portion 24. After the process in step S3 is completed, it proceeds to step S4.

The value of Nc(0) in the state that time t is zero, that is, at the time of engine starting, is set at the minimum rotational speed of the cooling fan 5.

In step S4, difference between the target rotational speed Nt and the current target rotational speed Nc(t) is obtained and it is determined whether or not the difference is larger than an acceleration-deceleration process determination value ΔN which is set in advance from experiment and the like. When the difference is larger than the acceleration-deceleration process determination value ΔN, it proceeds to step S5. When the difference is smaller than the acceleration-deceleration process determination value ΔN, it proceeds to step S6. In this manner, in step S4, it is determined whether the current target rotational speed Nc(t) at current time t gets closer to the target rotational speed Nt.

In step S5, a calculation process of an acceleration-deceleration addition amount ΔNc is performed. It is possible to determine how much pressurized oil is to be increased corresponding to the acceleration pattern by utilizing the acceleration-deceleration addition amount ΔNc. The acceleration-deceleration addition amount ΔNc can be obtained as a function value utilizing the target rotational speed Nt and the current target rotational speed Nc(t). After the process in step S5 is completed, it proceeds to step S7.

In step S6, the process to obtain the acceleration-deceleration addition amount ΔNc is invalidated. Here, as determining that the difference between the target rotational speed Nt and the current target rotational speed Nc(t) is small, the process to increase to the target rotational speed Nt is to be performed, that is, the process to set the target rotational speed Nt to be the current target rotational speed Nc(t) is performed. After the process in step S6 is completed, it proceeds to step S7.

In step S7, it is determined whether the current target rotational speed Nc(t) has reached the target rotational speed Nt. When the current target rotational speed Nc(t) has reached the target rotational speed Nt, it proceeds to step S8. In the case of the non-reached, that is, in the case of being under acceleration, it proceeds to step S11. In short, in the case of the non-reached, the process at the correction portion 26 is skipped.

In step S8, the process at the correction portion 26 in FIG. 3 is performed. That is, control deviation E between the current target rotational speed Nc(t) corresponding to current time t and the rotational speed of of the cooling fan 5 at current time t detected by the cooling fan rotational speed sensor 15 is obtained. The control deviation s can be calculated through a relation equation of "ϵ=Nc(t)−nf. After the process in step S8 is completed, it proceeds to step S9.

In step S9, a process to calculate integral addition ∫(ϵ) of the control deviation ϵ from time zero to time t and a process to calculate deviation differential addition Δϵ are performed. After the process in step S9 is completed, it proceeds to step S10.

By the way, the subsequent control cycle to be performed after the current control cycle is completed is to be performed with current time t being shifted to time t+1. Accordingly, in step S10, a process to set the current target rotational speed Nc(t) at current time t is set to be the current target rotational speed Nc(t+1) at time t+1 is performed. After the process in step S10 is completed, it proceeds to step S13.

In proceeding step S11 as determined being under acceleration-deceleration at the determination of step S7, a process to obtain the current target rotational speed Nc(t+1) at time t+1 is performed as adding the acceleration-deceleration addition value ΔNc which is obtained in step S5 to the value of the current target rotational speed Nc(t) at current time t. After the process in step S11 is completed, it proceeds to step S12.

In step S12, a process to invalidate correction with the PID control under acceleration-deceleration is performed. That is, a process to set the control deviation c to be zero and a process to set the integral addition ∫ϵ to be zero are performed. After the process in step S12 is completed, it proceeds to step S13. That is, the control to increase the rotational speed of the hydraulic motor 4 in accordance with the acceleration pattern is performed without performing the PID control under acceleration.

In step S13, a process to set the command rotational speed Nf(t+1) at time t+1 is performed. That is, the value of the command rotational speed Nc(t+1) at time t+1 is set to be a value of addition of a value of the current target rotational speed Nc(t+1) at time t+1 obtained at the rotational speed command calculation portion 24, a multiplied value of the control deviation ϵ by a proportional gain kp being a constant, a multiplied value of the value of the integral addition ∫ϵ by an integral gain Ki being a constant, and a multiplied value of the value of deviation differential addition Δϵ by an differential gain Kd being a constant.

Since both of the value of the deviation differential value Δϵ and the value of the integral addition ∫ϵ are zero under acceleration, Nf(t+1) remains at Nc(t+1). After the process in step S13 is completed, it proceeds to step S14.

In step S14, a process is performed to control the flow rate of pressurized oil discharged from the hydraulic pump 2 so that the cooling fan 5 is rotated at the command rotational speed Nf(t+1) which is set in step S13. A process to calculate a pump swash plate position Q(t+1) for controlling the swash angle of the hydraulic pump 2 is performed to perform the process of controlling the flow rate of pressurized oil discharged from the hydraulic pump 2. Here, the pump swash plate position Q(t+1) is indicated by pump capacity Q cc/rev. However, it is also possible to indicate by the swash plate angle of the hydraulic pump 2.

As described above, since the target rotational speed is achieved owing to the current engine rotational speed and the pump capacity, the pump swash plate position Q(t+1) can be obtained as a function value based on the command rotational speed Nf(t+1) which is set in step S13 and the engine rotational speed ne. As the process in step S14 which is described above, it is described to perform calculating of the pump swash plate position Q(t+1). Here, it is also possible to control the rotational speed of the hydraulic motor 4 by controlling the flow rate control valve 12, 14 as illustrated in FIG. 7 or FIG. 8. Accordingly, it is also possible to adopt the process to calculate a control signal for controlling the flow rate control valve 12, 14 as the process in step S14. After the process in step S14 is completed, it proceeds to step S15.

In step S15, a process to output a control signal against the flow rate control means 25 in FIG. 3 is performed. That is, the process to output pump control current I(t+1) for controlling the swash plate control valve 6 in FIG. 1 to the flow rate control means 25 in FIG. 2 is performed. The pump control current I(t+1) can be obtained as a function value of the pump swash plate position Q(t+1).

When the flow rate control valve 12, 14 illustrated in FIG. 7 or FIG. 8 is utilized as the flow rate control means 25, it is possible to output an electric signal to control a spool position of the flow rate control valve 12, 14. After the process in step S15 is completed, it proceeds to step S16.

Here, the subsequent control cycle is treated as at time t+1 in the current control cycle. When the subsequent control cycle is being performed, current time must be reread as t. Accordingly, since the value of the current target rotational speed Nc(t+1) is to be used as that of the current target rotational speed Nc(t) in the subsequent cycle, a process to set the value of the current target rotational speed Nc(t+1) to be the current target rotational speed Nc(t) is performed in step S16. When the process in step S16 is completed, the respective processes in the present control steps are finished.

Figure 5:
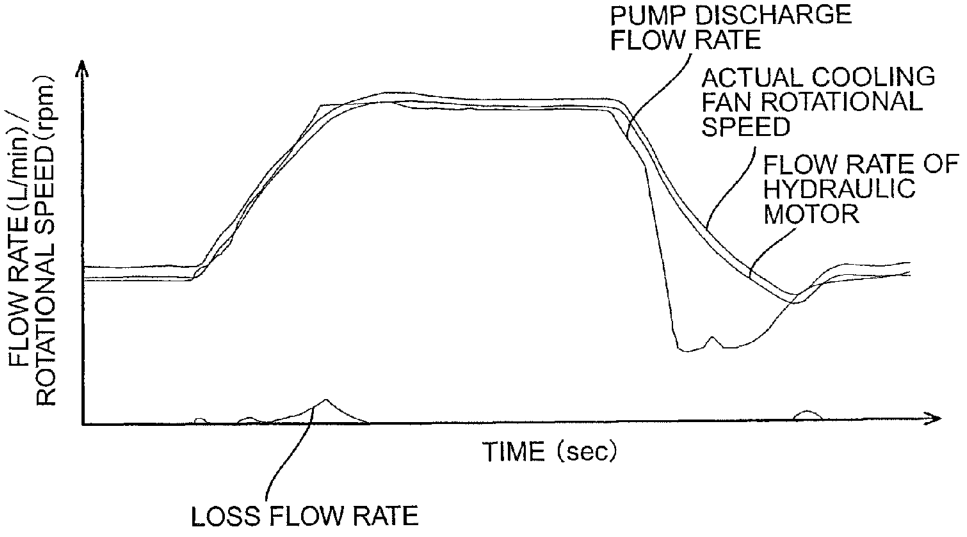
FIG. 5 is a schematic view of measured data at the time of rotation rising of the cooling fan of the present embodiment.
Figure 6:
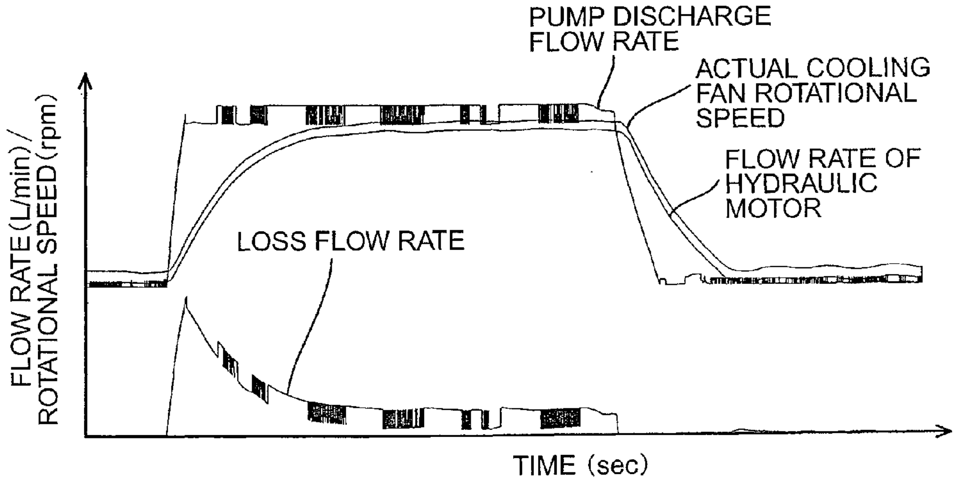
FIG. 6 is a schematic view of measured data at the time of rotation rising of a cooling fan in the related art.

FIGS. 5 and 6 are schematic illustrations of graphs respectively indicating a tendency of measured data at the time of rising of the cooling fan rotation. FIG. 5 is a graph with the control of the invention. FIG. 6 is a graph without the control of the invention.

In FIGS. 5 and 6, the respective horizontal axes denote time at the same scale. The respective vertical axes being associated with the respective graphs of FIGS. 5 and 6 denote the rotational speed (rpm) at the same scale and the flow rate (L/min) at the same scale. FIGS. 5 and 6 include graphs indicating temporal variations such as a temporal variation of the pump discharge flow rate, a temporal variation of the actual rotational speed of the cooling fan 5, a temporal variation of the flow rate of the hydraulic motor 4 to be used at the hydraulic motor 4 when the cooling fan 5 is rotated, and a temporal variation of a loss flow rate discharged from the hydraulic pump 2 but to be wasted without being used for the rotation of the hydraulic motor 4.

FIG. 6 indicates a case that the flow rate of pressurized oil discharged from the hydraulic pump 2 when increasing the current rotational speed of the cooling fan 5 to the target rotational speed is set to the flow rate of pressurized oil required for rotating the cooling fan 5 at the target rotational speed. Meanwhile, FIG. 5 indicates a case that the flow rate of pressurized oil discharged from the hydraulic pump 2 when increasing the current rotational speed of the cooling fan 5 to the target rotational speed is controlled by performing the control based on the invention.

In the case of FIG. 6, pressurized oil is supplied to the hydraulic motor 4 at the rate to be capable of increasing the rotational speed of the hydraulic motor 4 at once to the target rotational speed. Accordingly, the pump discharge flow rate being the discharge flow rate from the hydraulic pump 2 is to be increased to the desired flow rate at once. Then, pressurized oil is to be supplied to the hydraulic motor 4 at the flow rate which is increased at once.

However, with the hydraulic motor 4 and the cooling fan 5, the rotational speed cannot be increased at once owing to influence of force respectively due to inertia to maintain a stopped state. Accordingly, it is to be gradually increased in a gentle manner as the graph indicating the temporal variation of the actual rotational speed of the cooling fan 5 and the temporal variation of the flow rate of the hydraulic motor 4 in FIG. 6.

Consequently, as the loss flow rate being the difference between the pump discharge flow rate and the flow rate required for the hydraulic motor 4, a large amount of loss flow rate is to be generated at the time of rising toward the target rotational speed of the cooling fan 5.

On the contrary, when the control of the invention as illustrated in FIG. 5 is performed, the graph of the pump discharge flow rate and the graph of necessary flow rate for the hydraulic motor 4 can be raised along the approximately same curve which indicates the approximately same tendency. In addition, approximately all amount of the pump discharge flow rate can be used for driving the hydraulic motor 4. Further, the fan rotational speed of the cooling fan can be raised along the curve indicating the similar tendency to the graph of the pump discharge flow rate as being cooperative with driving of the hydraulic motor 4.

Further, as indicated at the lower side of FIG. 5, the loss flow rate being the difference between the pump discharge flow rate and the necessary flow rate for the hydraulic motor 4 can be in an extremely small state. Furthermore, as the loss flow rate indicated in FIG. 6, a flow rate of a constant amount or more is continuously wasted while performing the drive control of the hydraulic motor 4. However, according to the invention indicated in FIG. 5, although some loss flow rate occurs while the rotation of the cooling fan 5 is increased to the target rotational speed, the amount of the loss flow rate is to be extremely smaller than that of the case in FIG. 6.

In addition, according to the invention of FIG. 5, there is almost no loss flow rate occurring after the rotation of the cooling fan 5 reaches the target rotational speed. Accordingly, the flow rate of pressurized oil being the pump discharge flow rate from the hydraulic pump 2 can be used effectively for driving the hydraulic motor 4. Accordingly, it is possible to prevent occurrence of harmful effects such as deterioration of engine fuel consumption, increase of hydraulic oil temperature, and increase of relief noise.

INDUSTRIAL APPLICABILITY

According to the invention, technical concepts of the invention can be preferably applied to drive control of a cooling fan mounted on a work vehicle.

DESCRIPTION OF NUMERALS

2 Variable displacement type hydraulic pump
4 Hydraulic motor
5 Cooling fan
6 Swash plate control valve
7 Controller
12, 14 Flow rate control valve
22 Target rotational speed setting portion
23 Acceleration pattern setting portion
24 Rotational speed command value calculation portion
25 Flow rate control means
26 Correction portion

The invention claimed is:

1. A cooling fan driving device comprising:
- a hydraulic pump for a cooling fan, the hydraulic pump being driven by an engine;
- a hydraulic motor to which pressurized oil discharged from the hydraulic pump is supplied and which rotates the cooling fan;
- an oil temperature sensor which detects temperature of hydraulic oil;
- a water temperature sensor which detects temperature of refrigerant;
- a rotational speed sensor which detects the rotational speed of the engine;
- flow rate control means which controls a flow rate of pressurized oil to be supplied to the hydraulic motor; and
- a controller which controls the flow rate control means,
- wherein the controller includes a target rotational speed setting portion which sets the target rotational speed of the cooling fan, an acceleration pattern setting portion which sets an acceleration pattern for increasing the rotational speed of the cooling fan to the target rotational speed, and a rotational speed command calculation portion which issues a command of the flow rate of pressurized oil supplied to the hydraulic motor, the target rotational speed setting portion sets the target rotational speed of the cooling fan based on respective detection signals from the oil temperature sensor, the water temperature sensor and the rotational speed sensor,
- wherein the acceleration pattern setting portion sets the acceleration pattern for increasing the rotational speed of the cooling fan to the target rotational speed based on the rotational speed of the engine detected by the rotational speed sensor, the target rotational speed of the cooling fan set at the target rotational speed setting portion, and magnitude of force due to inertia of the cooling fan and the hydraulic motor,
- wherein the acceleration pattern is set in advance based on performance of the hydraulic motor and at least one property of the cooling fan, and
- wherein the rotational speed command calculation portion calculates a command value to control the flow rate control means based on the rotational speed of the engine, the target rotational speed of the cooling fan set at the target rotational speed setting portion, and the acceleration pattern set at the acceleration pattern setting portion so that the rotational speed of the cooling fan is increased based on the acceleration pattern from the current rotational speed to the target rotational speed.

2. The cooling fan driving device according to claim 1, wherein the at least one property of the cooling fan includes one or more of size and weight of the cooling fan.

3. The cooling fan driving device according to claim 1, wherein the flow rate control means is a swash plate angle control valve which controls a swash plate angle of the hydraulic pump of a variable displacement type.

4. The cooling fan driving device according to claim 1, wherein the flow rate control means is a flow rate control valve which controls the flow rate of pressurized oil supplied to the hydraulic motor.

5. A fan rotational speed control method to control the fan rotational speed of a cooling fan by supplying pressurized oil discharged from a hydraulic pump for the cooling fan to a hydraulic motor for the cooling fan, the hydraulic pump being driven by an engine, and by controlling a flow rate of the pressurized oil supplied to the hydraulic motor, comprising:

determining the target rotational speed of the cooling fan through temperature of hydraulic oil, temperature of refrigerant and the rotational speed of the engine which are detected;

determining an acceleration pattern for increasing the rotational speed of the cooling fan to the target rotational speed through the rotational speed of the engine, the determined target rotational speed of the cooling fan, and magnitude of force due to inertia of the cooling fan and the hydraulic motor;

setting in advance the acceleration pattern based on performance of the hydraulic motor and at least one property of the cooling fan; and controlling the rotational speed of the cooling fan so as to be increased from the current rotational speed to the target rotational speed based on the acceleration pattern by controlling the flow rate of pressurized oil supplied to the hydraulic motor based on the rotational speed of the engine, the determined target rotational speed of the cooling fan and the acceleration pattern.

6. The fan rotational speed control method according to claim 5, wherein the at least one property of the cooling fan includes one or more of size and weight of the cooling fan.

7. A cooling fan driving device comprising:

a hydraulic pump for a cooling fan, the hydraulic pump being driven by an engine;

a hydraulic motor to which pressurized oil discharged from the hydraulic pump is supplied and which rotates the cooling fan;

an oil temperature sensor which detects temperature of hydraulic oil;

a water temperature sensor which detects temperature of refrigerant;

a rotational speed sensor which detects the rotational speed of the engine;

flow rate control means which controls a flow rate of pressurized oil to be supplied to the hydraulic motor; and a controller which controls the flow rate control means, wherein the controller includes a target rotational speed setting portion which sets the target rotational speed of the cooling fan, a means for setting an acceleration pattern for increasing the rotational speed of the cooling fan to the target rotational speed, and a rotational speed command calculation portion which issues a command of the flow rate of pressurized oil supplied to the hydraulic motor, the target rotational speed setting portion sets the target rotational speed of the cooling fan based on respective detection signals from the oil temperature sensor, the water temperature sensor and the rotational speed sensor, wherein the means for setting the acceleration pattern sets the acceleration pattern for increasing the rotational speed of the cooling fan to the target rotational speed based on the rotational speed of the engine detected by the rotational speed sensor, the target rotational speed of the cooling fan set at the target rotational speed setting portion, and magnitude of force due to inertia of the cooling fan and the hydraulic motor, wherein the acceleration pattern is set in advance based on performance of the hydraulic motor and at least one property of the cooling fan, and wherein the rotational speed command calculation portion calculates a command value to control the flow rate control means based on the rotational speed of the engine, the target rotational speed of the cooling fan set at the target rotational speed setting portion, and the acceleration pattern set by the means for setting the acceleration pattern so that the rotational speed of the cooling fan is increased based on the acceleration pattern from the current rotational speed to the target rotational speed.

8. The cooling fan driving device according to claim 7, wherein the at least one property of the cooling fan includes one or more of size and weight of the cooling fan.

9. The cooling fan driving device according to claim 7, wherein the flow rate control means is a swash plate angle control valve which controls a swash plate angle of the hydraulic pump of a variable displacement type.

10. The cooling fan driving device according to claim 7, wherein the flow rate control means is a flow rate control valve which controls the flow rate of pressurized oil supplied to the hydraulic motor.

* * * * *